US012669872B2

(12) United States Patent
Yang et al.

(10) Patent No.: US 12,669,872 B2
(45) Date of Patent: Jun. 30, 2026

(54) DATA TRANSFER METHOD AND ELECTRONIC DEVICE

(71) Applicant: GUANGDONG OPPO MOBILE TELECOMMUNICATIONS CORP., LTD., Dongguan (CN)

(72) Inventors: Junzheng Yang, Dongguan (CN); Hong Wan, Dongguan (CN); Xuan He, Dongguan (CN); Weidong Zhong, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 108 days.

(21) Appl. No.: 18/878,861

(22) PCT Filed: Aug. 31, 2021

(86) PCT No.: PCT/CN2021/115822
§ 371 (c)(1),
(2) Date: Dec. 24, 2024

(87) PCT Pub. No.: WO2022/100219
PCT Pub. Date: May 19, 2022

(65) Prior Publication Data
US 2025/0216949 A1     Jul. 3, 2025

(30) Foreign Application Priority Data

Nov. 16, 2020     (CN) .......................... 202011283401.4

(51) Int. Cl.
*G06F 3/01*          (2006.01)
*G06F 3/14*          (2006.01)
(Continued)

(52) U.S. Cl.
CPC ............ *G06F 3/017* (2013.01); *G06F 3/1454* (2013.01); *G06V 20/60* (2022.01); *H04N 23/667* (2023.01)

(58) Field of Classification Search
CPC ....... G06F 3/017; G06F 3/1454; G06V 20/60; G06V 40/20; H04N 23/667; H04N 23/80; H04L 65/764
See application file for complete search history.

(56) References Cited

U.S. PATENT DOCUMENTS

| | | | |
|---|---|---|---|
| 8,943,582 B1 * | 1/2015 | Zhou ................... | G06F 3/04842 726/19 |
| 9,894,115 B2 * | 2/2018 | Kim ..................... | G06F 3/0488 |

(Continued)

FOREIGN PATENT DOCUMENTS

| | | |
|---|---|---|
| CN | 102725723 A | 10/2012 |
| CN | 102831404 A | 12/2012 |

(Continued)

OTHER PUBLICATIONS

First Office Action and search report for Chinese Patent Application No. 202011283401.4 mailed on Feb. 16, 2022, and its English translation provided by Applicant's Foreign Counsel.

(Continued)

*Primary Examiner* — Grant Sitta
(74) *Attorney, Agent, or Firm* — Ladas & Parry, LLP

(57)          ABSTRACT

A data transfer method and an electronic device are provided. The method includes: controlling camera modules of N devices to collect first image data in response to a triggering instruction, where N is a natural number greater than or equal to 2; determining a source device in the N devices based on the first image data; controlling camera modules of N-1 devices other than the source device to collect second image data; determining a target device in the N-1 devices based on the second image data; and controlling
(Continued)

the source device for transferring a target content to the target device.

19 Claims, 9 Drawing Sheets

(51) Int. Cl.
*G06V 20/60* (2022.01)
*H04N 23/667* (2023.01)

(56) References Cited

U.S. PATENT DOCUMENTS

| | | | | |
|---|---|---|---|---|
| 9,928,652 | B2* | 3/2018 | Nicholas | G06F 3/011 |
| 9,986,044 | B2* | 5/2018 | Chen | H04L 67/51 |
| 10,176,198 | B1 | 1/2019 | Dhua et al. | |
| 10,447,989 | B2* | 10/2019 | Pu | H04N 13/156 |
| 10,528,386 | B2* | 1/2020 | Yu | G06F 9/4856 |
| 11,227,172 | B2* | 1/2022 | Holz | G06V 10/147 |
| 12,449,912 | B2* | 10/2025 | Seiler | G06F 3/0304 |
| 2008/0152263 | A1 | 6/2008 | Harrison | |
| 2010/0157064 | A1* | 6/2010 | Cheng | G08B 13/19645 |
| | | | | 348/169 |
| 2010/0281440 | A1* | 11/2010 | Underkoffler | G06V 10/96 |
| | | | | 715/863 |
| 2012/0030632 | A1* | 2/2012 | McRae | H04N 21/47214 |
| | | | | 715/863 |
| 2012/0109608 | A1 | 5/2012 | Core et al. | |
| 2012/0198353 | A1 | 8/2012 | Lee et al. | |
| 2013/0328763 | A1* | 12/2013 | Latta | G06F 3/017 |
| | | | | 345/156 |
| 2014/0104394 | A1* | 4/2014 | Yanai | G06F 3/017 |
| | | | | 348/47 |
| 2016/0034176 | A1* | 2/2016 | Sirpal | G06F 3/04845 |
| | | | | 715/761 |
| 2016/0112501 | A1* | 4/2016 | Wheeler | H04L 67/125 |
| | | | | 709/204 |
| 2016/0239259 | A1* | 8/2016 | Lenchner | G10L 15/1822 |

| | | | | |
|---|---|---|---|---|
| 2017/0262311 | A1* | 9/2017 | Yu | G06F 9/4856 |
| 2017/0277273 | A1* | 9/2017 | Kauffmann | G06V 40/20 |
| 2018/0014187 | A1* | 1/2018 | Chan | G06F 1/163 |
| 2020/0110928 | A1 | 4/2020 | Al Jazaery et al. | |

FOREIGN PATENT DOCUMENTS

| | | | |
|---|---|---|---|
| CN | 102866777 | A | 1/2013 |
| CN | 102938825 | A | 2/2013 |
| CN | 103929464 | A | 7/2014 |
| CN | 104008580 | A | 8/2014 |
| CN | 104123191 | A | 10/2014 |
| CN | 204013873 | U | 12/2014 |
| CN | 106375703 | A | 2/2017 |
| CN | 106507286 | A | 3/2017 |
| CN | 106982330 | A | 7/2017 |
| CN | 106993161 | A | 7/2017 |
| CN | 108038452 | A | 5/2018 |
| CN | 109964478 | A | 7/2019 |
| CN | 110319882 | A | 10/2019 |
| CN | 111062313 | A | 4/2020 |
| CN | 111083364 | A | 4/2020 |
| CN | 111459718 | A | 7/2020 |
| CN | 112272191 | A | 1/2021 |
| EP | 2667567 | A1 | 11/2013 |
| EP | 2891957 | A2 | 7/2015 |
| WO | 2019071623 | A1 | 4/2019 |

OTHER PUBLICATIONS

Chinese Notification to Grant Patent Right for Invention for Chinese Patent Application No. 202011283401.4 mailed on Jun. 1, 2022, and its English translation provided by Applicant's Foreign Counsel.
International Search Report for International Patent Application No. PCT/CN2021/115822 mailed on Nov. 22, 2021 and its English translation from WIPO.
Written Opinion for International Patent Application No. PCT/CN2021/115822 mailed on Nov. 22, 2021 and its English translation from WIPO.

\* cited by examiner

200 camera module
210 trigger sensor
220 flow system 230 gesture
identifying unit
231 trigger
identifying unit
232 control unit 233 special effect unit
234 redirection system 240

| sensor module 380 | pressure sensor 380A | gyroscope sensor 380B | air pressure sensor 380C | magnetic sensor 380D | acceleration sensor 380E | distance sensor 380F |
|---|---|---|---|---|---|---|
| | proximity light sensor 380G | fingerprint sensor 380H | temperature sensor 380J | touch sensor 380K | ambient light sensor 380L | bone conduction sensor 380M | system on a chip SoC 310 mobile communication module 2G/3G/4G/5G/6G...350 — antenna 1 wireless communication module BT/WLAN/GNSS/NFC/IR/FM 460 — antenna 2 battery 332 charge management module 340 power management module 331

USB Interface 330

Charging input

| external memory interface 320 | internal memory 321 | key 390 | moto r 391 | indicator 392 | camera 1-N 393 | SIM card interface 1-N 395 | audio module 370 | | |
|---|---|---|---|---|---|---|---|---|---|
| | | | | | | | speaker 370A | receiver 370B | micro-phone 370C |

FIG. 1C

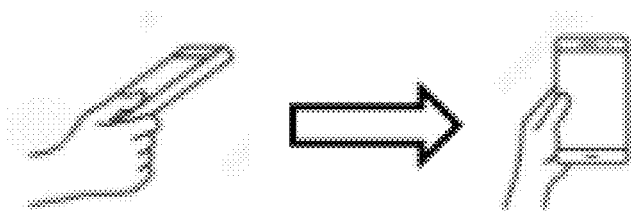

FIG. 2A source device                    target device shrink
gradually enlarge
gradually source device                    target device

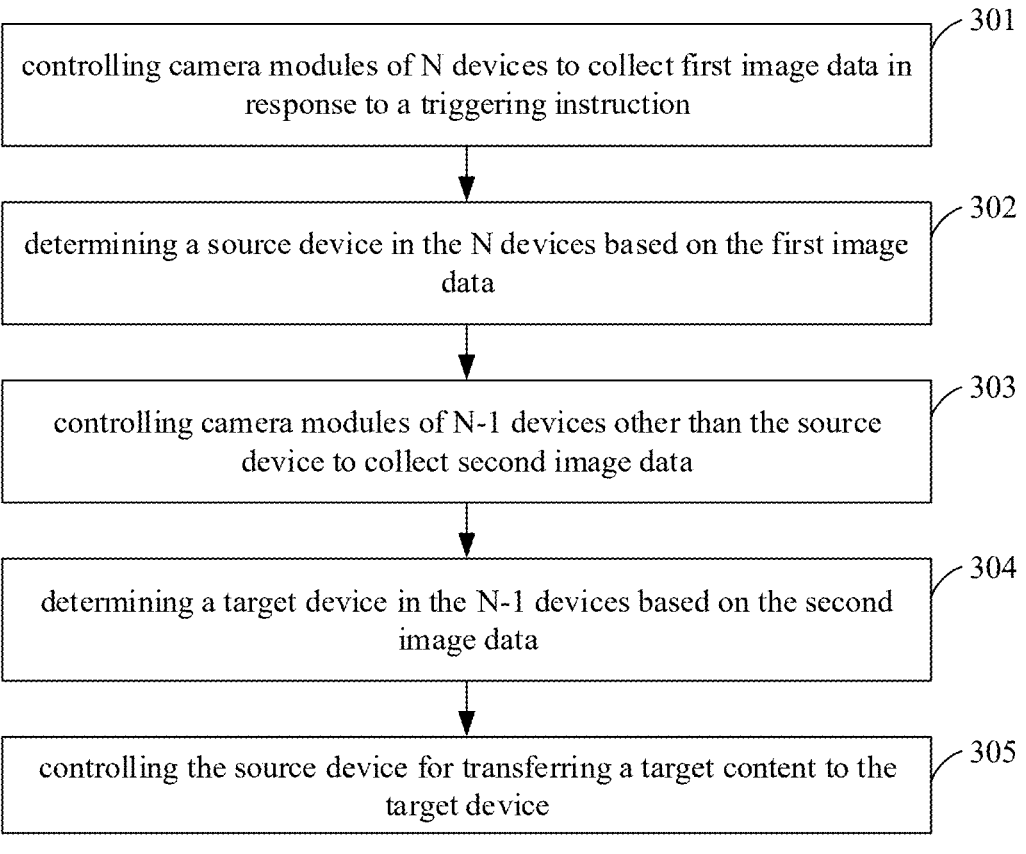

controlling camera modules of N devices to collect first image data in response to a triggering instruction —301 determining a source device in the N devices based on the first image data —302 controlling camera modules of N-1 devices other than the source device to collect second image data —303 determining a target device in the N-1 devices based on the second image data —304 controlling the source device for transferring a target content to the target device —305

FIG. 3

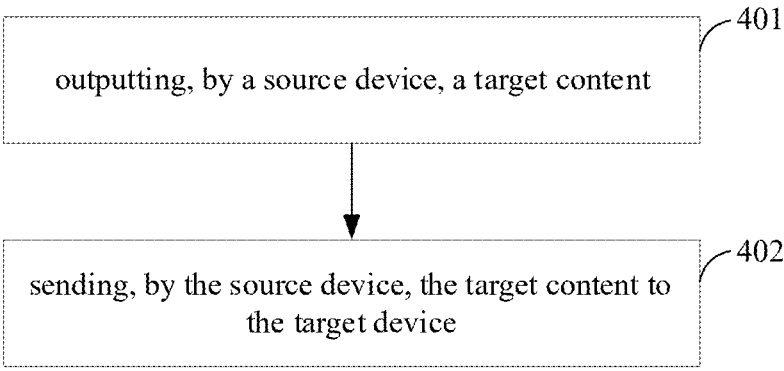

outputting, by a source device, a target content —401 sending, by the source device, the target content to the target device —402

FIG. 4

DATA TRANSFER METHOD AND ELECTRONIC DEVICE

CROSS-REFERENCE TO RELATED APPLICATIONS

The present disclosure is a 35 U.S.C. § 371 National Phase conversion of International Patent Application No. PCT/CN2021/115822, filed Aug. 31, 2021, which claims priority to Chinese Patent Application No. 202011283401.4, filed Nov. 16, 2020, and the contents of both of which are incorporated herein by their entireties.

TECHNICAL FIELD

The present disclosure relates to the field of communication technologies, and in particular to a data transfer method and an electronic device.

BACKGROUND

With the development of technology, the era of the internet of everything has come. In some application scenarios, a user needs to transfer streaming media information from one device to another device. Currently, a solution includes a method in which the streaming media information may be transferred between devices by using an ultra wide band (UWB) sensor and near field communication (NFC). For example, NFC tags may be installed on both a source device and a target device. After the NFC tags between the source device and the target device may make a close contact with each other, an image played on the source device may be transferred to the target device for playing. Alternatively, UWB sensors may be installed on both the source device and the target device, and the communication between the UWB sensors may be used to determine mutual positions of the source device and the target device, thereby enabling the source device to project a screen onto the target device.

However, the above-mentioned methods rely on a hardware, have many limitations, and require to be triggered in a short distance range, resulting in a poor user experience.

SUMMARY OF THE DISCLOSURE

In a first aspect, some embodiments of the present disclosure provide a data transfer method. The method includes: controlling camera modules of N devices to collect first image data in response to a triggering instruction, where N is a natural number greater than or equal to 2; determining a source device in the N devices based on the first image data; controlling camera modules of N-1 devices other than the source device to collect second image data; determining a target device in the N-1 devices based on the second image data; and controlling the source device for transferring a target content to the target device.

In a second aspect, some embodiments of the present disclosure provide a data transfer method. The method includes: outputting, by a source device, a target content, where the source device is a sending device of the target content, which is determined by an identifying device according to first data generated by N devices, N is a natural number greater than or equal to 2, the N devices include the identifying device, the source device, and a target device, any two devices of the N devices communicate with each other, and the identifying device is any one of the N devices; and sending, by the source device, the target content to the target device, where the target device is a receiving device of the target content, which is determined by the identifying device according to second data generated by the N devices.

In a third aspect, some embodiments of the present disclosure provide an electronic device. The electronic device includes a processor, a memory, and one or more programs. The one or more programs are stored in the memory and configured to be executed by the processor. The one or more programs include an instruction for performing: controlling camera modules of N devices to collect first image data in response to a triggering instruction, where N is a natural number greater than or equal to 2; determining a source device in the N devices based on the first image data; controlling camera modules of N-1 devices other than the source device to collect second image data; determining a target device in the N-1 devices based on the second image data; and controlling the source device for transferring a target content to the target device. Alternatively, the one or more programs include an instruction for performing: outputting, by a source device, a target content, where the source device is a sending device of the target content, which is determined by an identifying device according to first data generated by N devices, N is a natural number greater than or equal to 2, the N devices include the identifying device, the source device, and a target device, any two devices of the N devices communicate with each other, and the identifying device is any one of the N devices; and sending, by the source device, the target content to the target device, where the target device is a receiving device of the target content, which is determined by the identifying device according to second data generated by the N devices.

BRIEF DESCRIPTION OF THE DRAWINGS

In order to illustrate the technical solutions in some embodiments of the present disclosure or the related art more clearly, the following will briefly introduce the figures needed to be used in the description of some embodiments or the related art. Obviously, the drawings in the following description are only some embodiments of the present disclosure, and those skilled in the art may derive other figures from these figures without paying any creative work.

FIG. 1C is a schematic structural diagram of another electronic device according to some embodiments of the present disclosure.

FIG. 2A is a schematic diagram of a triggering mode according to some embodiments of the present disclosure.

FIG. 3 is a flowchart of a data transfer method according to some embodiments of the present disclosure.

FIG. 4 is a flowchart of another data transfer method according to some embodiments of the present disclosure.

DETAILED DESCRIPTION

In order to enable those skilled in the art to better understand a scheme of the present disclosure, the technical solutions in some embodiments of the present disclosure will be described clearly and completely with reference to the figures in some embodiments of the present disclosure. Obviously, the described embodiments are only a part of the embodiments of the present disclosure, rather than all the embodiments. Based on some embodiments of the present disclosure, all other embodiments obtained by those skilled in the art without paying any creative work are within the scope of the present disclosure.

The terms "first", "second", etc., in the description, claims, and aforesaid drawings of the present disclosure are used to distinguish different objects, but not to describe a specific sequence. In addition, the terms "including", "having", and any variations thereof are intended to cover non-exclusive inclusions. For example, a process, method, software, product, or device that includes a series of steps or units is not limited to the listed steps or units, but optionally further includes unlisted steps or units, or optionally further includes other steps or units inherent to the process, method, product or device.

The reference to "embodiment" herein means that a specific feature, structure, or characteristic described in connection with some embodiments may be included in at least one embodiment of the present disclosure. The appearances of the phrase at various positions in the specification are not necessarily all referring to the same embodiment, nor are separate or alternative embodiment mutually exclusive with other embodiments. It is explicitly and implicitly understood by those skilled in the art that some embodiments described herein may be combined with other embodiments. The embodiments of the present disclosure will be described in further detail below by referring to the accompanying drawings.

The following respectively comprehensively introduce some embodiments of the present disclosure from three aspects: software and hardware operating environments (Part I), overall process method and implementation of key technical solutions (Part II), and the scope protection of the claims of the present disclosure (Part III).

In a first part (Part I), the software and hardware operating environments of a technical solution provided in some embodiments of the present disclosure may be described as follows.

Figures 1A, 1B:
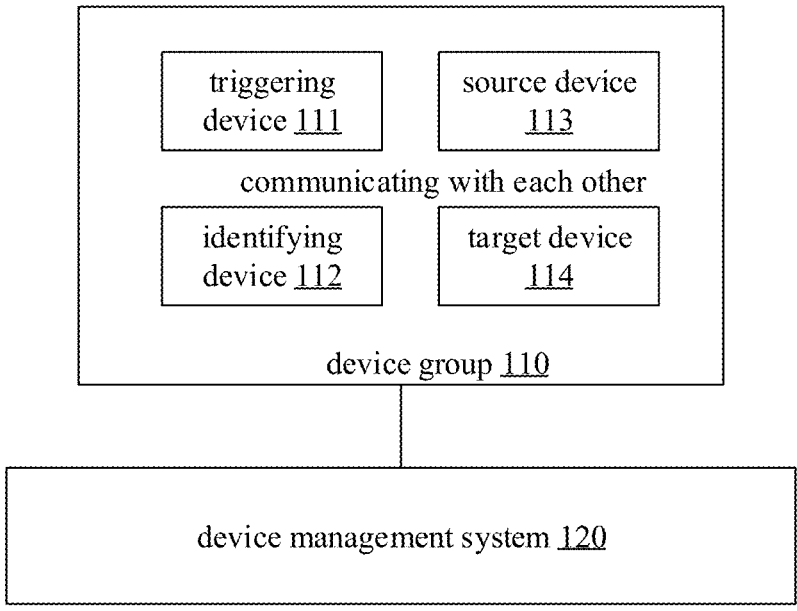
FIG. 1A is a schematic diagram of a system architecture of a data transfer method according to some embodiments of the present disclosure.
FIG. 1B is a schematic structural diagram of an electronic device according to some embodiments of the present disclosure.

As shown in FIG. 1A, FIG. 1A is a schematic diagram of a system architecture of a data transfer method according to some embodiments of the present disclosure. In some embodiments of the present disclosure, the system architecture includes a device group 110 and a device management system 120. The above-mentioned device group 110 includes N devices, and N is a natural number greater than or equal to 2. Any two devices of the N devices may communicate with each other. The above-mentioned device management system 120 may be a cloud system, and configured to manage all device information under a same user identification (ID). The device group 110 and the device management system 120 may communicate with each other. Any one of devices in the device group 110 may acquire a list, a specific IP address, etc., of all devices in the device group 110 from the device management system 120. In an embodiment, a device in a user's home may belong to a same user account, and any one of the devices in the device group 110 may acquire the IP address of a corresponding one of the devices through the device management system 120 for communication when the devices in the device group 110 need to communicate with each other. A specific communication mechanism may be a same local area network (LAN) formed by the device group 110. Alternatively, the device group 110 may be connected to a same wireless fidelity (WIFI), which is not specifically limited herein.

The above-mentioned device group 110 may include a triggering device 111, an identifying/recognition device 112, a source device 113, and a target device 114.

It should be noted that the triggering device 111 may be any one of the N devices, the identifying device 112 may be any one of the N devices, the source device 113 may be any one of the N devices other than the target device 114, and the target device may be any one of the N devices other than the source device 113. It is understood that the above-mentioned triggering device 111 may be simultaneously served as the identifying device 112. Alternatively, the above-mentioned triggering device 111 may be simultaneously served as the source device 113. Alternatively, the above-mentioned triggering device 111 may be simultaneously served as the target device 114. Alternatively, the above-mentioned triggering device 111 may be simultaneously served as the identifying device 112 and the source device 113. Alternatively, the above-mentioned triggering device 111 may be simultaneously served as the identifying device 112 and the target device 114. Alternatively, the above-mentioned triggering device 111 may be simultaneously served as the above-mentioned triggering device 111 is any one of the N devices other than the identifying device 112, the source device 113, and the target device 114. In summary, except that the source device 113 and the target device 114 cannot be a same device, any one of the devices in the device group may be served as the triggering device 111 and the identifying device 112. Terms "trigger/triggering" and "identifying/recognition" are merely descriptive terms used to distinguish functions to reduce confusion, which does not mean that the terms must be different devices. In an embodiment, the identifying device 112 may be a device with a strongest computing power in the device group 110.

The above-mentioned triggering device 111 may be configured to start a camera module of the triggering device 111 after receiving a user's triggering instruction, and send a first image-capturing instruction to N-1 devices in the device group 110 other than itself. The first image-capturing instruction may be configured to enable the N-1 devices to start a camera module corresponding to each of the N-1 devices, to start to collect/acquire an image.

The above-mentioned identifying device 112 may be configured to determine the source device 113 according to first data generated by the N devices, and may be configured to determine the target device 114 according to second data generated by the N devices. The first data may be captured first image data or a first gesture confidence, and the second data may be captured second image data or a second hand confidence.

The above-mentioned source device 113 may be configured to transfer a target content to the target device 114. In an embodiment, after the source device 113 is determined by the identifying device 112, the source device 113 may send a second image-capturing instruction to N-1 devices other than itself. The second image-capturing instruction may be configured to enable the N-1 devices to start to capture an image for a second time by using the camera module corresponding to the each of the N-1 devices.

The above-mentioned target device 114 may be configured to receive the target content from the source device 113 for display. The target content may be streaming media information, which may include, but not limited to, any one or any combination of an image, a text, a video, and an audio.

The following describes an electronic device provided in some embodiments of the present disclosure. It can be understood that the structures illustrated in some embodiments of the present disclosure do not constitute a specific limitation to the electronic device. In other embodiments of the present disclosure, the electronic device may include more or less components than shown, or combine some components, or separate some components, or arrange different components. The illustrated components may be implemented in hardware, software, or a combination of software and hardware.

As shown in FIG. 1B, FIG. 1B is a schematic structural diagram of an electronic device according to some embodiments of the present disclosure. N electronic devices may form the device group 110. The electronic device may include various handheld devices, vehicle-mounted devices, wearable devices, computing devices, or other processing equipment connected to wireless modem, as well as various forms of user equipment (UE), mobile stations (MS), terminal devices etc., which have wireless communication capabilities. Any electronic device 200 provided in some embodiments of the present disclosure may include a camera module 210, a trigger sensor 220, a stream-forwarding system 230, and a redirection system 240.

The above-mentioned stream-forwarding system 230 includes a gesture identifying unit 231, a trigger identifying unit 232, a control unit 233, and a special effect unit 234. The gesture identifying unit 231 is configured to receive image data from the camera module 210, perform gesture identifying, and determine the source device 113 and target device 114 according to the gesture. The trigger identifying unit 232 is configured to receive a triggering instruction from the trigger sensor 220, and determine whether the triggering instruction meets a preset triggering condition. When the triggering condition meets the preset triggering condition, the trigger identifying unit 232 is further configured to notify the control unit 233 to send an instruction to other electronic devices 200, so as to enable to the other electronic devices 200 to start camera modules 210. The control unit 233 may be further configured to control the special effect unit 234 to generate a special effect. The special effect may indicate the data transfer from the source device to the target device. It may be understood that the special effect unit 234 may generate a relevant special effect of transferring when the electronic device 200 is served as the source device 113 or the target device 114. In summary, the above-mentioned stream-forwarding system 230 is mainly configured to determine whether data transfer is necessary, determine the source device 113 and the target device 114, and generate a relevant special effect of data transfer.

The above-mentioned camera module 210 may include a camera array, which is not limited herein.

The above-mentioned trigger sensor 220 may include a gravity sensor, an optical sensor, an acoustic sensor, etc., which is not limited herein.

The above-mentioned redirection system 240 is mainly configured to control a specific operation of performing data transferring, such as screen projection, after the source device 113 and the target device 114 is determined by the stream-forwarding system 230.

The above-mentioned electronic device is mainly described from an aspect of a functional unit. The following describes the form of a common electronic device provided in some embodiments of the present disclosure in detail from the aspect of hardware structure with reference to FIG. 1C. FIG. 1C is a schematic structural diagram of another electronic device according to some embodiments of the present disclosure. as shown in FIG. 1C, the electronic device includes a system on a chip 310, an external memory interface 320, an internal memory 321, a universal serial bus (USB) interface 330, a charge management module 340, a power management module 341, a battery 342, an antenna 1, an antenna 2, a mobile communication module 350, a wireless communication module 360, an audio module 370, a speaker 370A, a receiver 370B, a microphone 370C, a sensor module 380, a key 390, a motor 391, an indicator 392, a camera 393, a display screen 393, and a subscriber identification module (SIM) card interface 395, etc. The sensor module 380 may include a pressure sensor 380A, a gyroscope sensor 380B, an air pressure sensor 380C, a magnetic sensor 380D, an acceleration sensor 380E, a distance sensor 380F, a proximity light sensor 380G, a fingerprint sensor 380H, a temperature sensor 380J, a touch sensor 380K, and an ambient light sensor 380L, a bone conduction sensor 380M, etc.

The wireless communication function of the electronic device 300 may be implemented by the antenna 1, the antenna 2, the mobile communication module 350, the wireless communication module 360, a modulation and demodulation processor, a baseband processor, etc.

The antenna 1 and the antenna 2 are configured to transmit and receive an electromagnetic wave signal. Each antenna in the electronic device 300 may be configured to cover a single or multiple communication frequency bands. Different antennas may further be multiplexed to improve antenna utilization. For example, the antenna 1 may be multiplexed as a diversity antenna of a wireless local area network. In other embodiments, the antenna may be used in conjunction with a tuning switch.

The mobile communication module 350 may provide a wireless communication solution including 2G/3G/3G/5G/6G, etc. applied to the electronic device 300. The mobile communication module 350 may include at least one filter, switch, power amplifier, low noise amplifier (LNA), etc. The mobile communication module 350 may receive electromagnetic waves from the antenna 1, perform further processing (such as filtering, amplifying, or the like) on the received electromagnetic waves, and transmit the processed electromagnetic waves to the modulation and demodulation processor for demodulation. The mobile communication module 350 may further amplify the signal modulated by the modulation and demodulation processor, and then convert the signal into electromagnetic waves for radiation out of the electronic device 300 through the antenna 1. In some embodiments, at least part of function modules of the mobile communication module 350 may be arranged in the processor 340. In some embodiments, at least part of the function modules of the mobile communication module 350 may be arranged in the same component as at least part of modules of the processor 340.

The modulation and demodulation processor may include a modulator and a demodulator. The modulator is configured to modulate a low frequency baseband signal to be sent into a medium and high frequency signal. The demodulator is configured to demodulate the received electromagnetic wave signal into a low frequency baseband signal. Then the demodulator transmits the demodulated low-frequency baseband signal to the baseband processor for processing. The low frequency baseband signal is processed by the baseband processor and transmitted to the application processor. The application processor outputs a sound signal through an audio device (which is not limited to the speaker 370A, the receiver 370B, etc.), or displays an image or a video through the display screen 394. In some embodiments, the modulation and demodulation processor may be a stand-alone device. In other embodiments, the modulation and demodulation processor may be independent of the processor 340, and may be arranged in the same component as the mobile communication module 350 or other function modules.

The wireless communication module 360 may provide wireless communication solutions such as wireless local area networks (WLAN) (such as wireless fidelity (Wi-Fi) networks), Bluetooth (BT), global navigation satellite system (GNSS), frequency modulation (FM), near field communication (NFC), infrared technology (IR), and so on. The wireless communication module 360 may be one or more devices that are integrated with at least one communication processing module. The wireless communication module 360 receives the electromagnetic wave via the antenna 2, modulates a frequency of the electromagnetic wave signal and filters the electromagnetic wave signal, and sends the processed signal to the processor 340. The wireless communication module 360 may further receive the signal transmitted from the processor 340, modulate a frequency of the signal and amplify the signal, and then convert the signal into an electromagnetic wave and radiate the converted electromagnetic wave out of the electronic device 300 through the antenna 2.

In some embodiments, the antenna 1 of the electronic device 300 is coupled with the mobile communication module 350, and the antenna 2 is coupled with the wireless communication module 360, such that the electronic device 300 may communicate with the network and other devices through the wireless communication technology. The wireless communication technology may include global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, and/or IR technology, etc. The GNSS may include a global positioning system (GPS), a global navigation satellite system (GLONASS), a beidou satellite navigation system (BDS), i.e., a compass navigation satellite system, a quasi-zenith satellite system (QZSS), and/or satellite based augmentation systems (SBAS).

The charging management module 340 is configured to receive charging input from the charger. The charger may be a wireless charger or a wired charger. In some wired charging embodiments, the charging management module

340 may receive the charging input from the wired charger through the USB interface 330. In some wireless charging embodiments, the charging management module 340 may receive wireless charging input through a wireless charging coil of the electronic device 300. When charging the battery 342, the charging management module 340 may further supply power to the electronic device through the power management module 341.

The power management module 341 is configured to be connected to the battery 332, the charging management module 340, and the processor 340. The power management module 341 receives input from the battery 332 and/or the charging management module 340, and supplies power to the processor 340, the internal memory 321, the external memory, the display screen 394, the camera 393, the wireless communication module 360, etc. The power management module 341 may further be configured to monitor parameters such as battery capacity, battery cycle times, battery health status (such as leakage or impedance), etc. In some other embodiments, the power management module 341 may further be arranged in the processor 340. In other embodiments, the power management module 341 and the charging management module 340 may further be arranged in the same component.

The electronic device 300 may implement a display function through a GPU, the display screen 394, the application processor, etc. The GPU is a microprocessor for image processing, and is connected to the display screen 394 and the application processor. The GPU is configured to perform mathematical and geometric calculations for graphics rendering. The processor 340 may include one or more GPUs that may execute program instructions to generate or alter/change display information.

The display screen 394 is configured to display an image, a video, etc. The display screen 394 includes a display panel. The display panel may be a liquid crystal display (LCD), an organic light-emitting diode (OLED), an active-matrix organic light-emitting diode (AMOLED), a flexible light-emitting diode (flex light-emitting diode, FLED), a Mini-LED, a Micro-LED, a Micro-OLED, quantum dot light emitting diode (quantum dot light emitting diodes, QLED), and so on. In some embodiments, the electronic device 300 may include 1 or N display screens 394, and N is a natural number positive integer greater than 1. In some embodiments of the present disclosure, the display screen 394 may be configured to display red dots or a number of red dots on the icon of each APP, to prompt the user that there is a new message to be processed.

The electronic device 300 may realize a shooting function through the ISP, the camera 393, a video codec, the GPU, the display screen 394, and the application processor.

The ISP is configured to process data fed back by the camera 393. In some embodiments, when taking a picture, a shutter is opened, light is transmitted to a photosensitive component of the camera through a lens, a light signal is converted into an electrical signal, and the photosensitive component of the camera transmits the electrical signal to the ISP for processing to convert the electrical signal into an image visible to a naked eye. The ISP may further perform algorithm optimization on an image noise, a brightness, and a skin tone. The ISP may further optimize an exposure, a color temperature, and other parameters of a shooting scene. In some embodiments, the ISP may be arranged in the camera 393.

The camera 393 is configured to capture a still image or video. An object is projected through the lens to generate an optical image onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP, and the ISP is configured to convert the electrical signal into a digital image signal. The ISP outputs the digital image signal to the DSP for processing. The DSP converts the digital image signal into standard RGB, YUV, or other formats of image signals. In some embodiments, the electronic device 300 may include 1 or N cameras 393, and N is a natural number greater than 1.

The external memory interface 320 may be configured to be connected an external memory card, such as a Micro SD card, so as to expand a storage capacity of the electronic device 300. The external memory card communicates with the processor 340 through the external memory interface 320 to realize a data storage function. For example, files like a music, a video, etc. is stored in the external memory card.

The internal memory 321 may be configured to store a computer executable program code, and the computer executable program code includes instructions. The processor 340 executes various functional applications and data processing of the electronic device 300 by executing the instructions stored in the internal memory 321. The internal memory 321 may include a storage program area and a storage data area. The storage program area may store an operating system, an application program required for at least one function (such as a sound playback function, an image playback function, etc.), etc. The storage data area may store data (such as audio data, a phone book, etc.) created during the use of the electronic device 300 etc. In addition, the internal memory 321 may include a high-speed random access memory, and may also include a non-volatile memory, such as at least one magnetic disk storage device, flash memory device, universal flash storage (UFS), etc. In some embodiments of the present disclosure, the internal memory 321 may be configured to store the data of each APP message, and may also be configured to store an elimination strategy for the red dot corresponding to each APP.

The electronic device 300 may implement audio functions, such as music playback, recording, etc., through the audio module 370, the speaker 370A, the receiver 370B, the microphone 370C, the earphone interface 370D, an application processor, etc.

The audio module 370 is configured to convert digital audio information into an analog audio signal output, and also configured to convert an analog audio input into a digital audio signal. The audio module 370 may also be configured to encode and decode an audio signal. In some embodiments, the audio module 370 may be arranged in the processor 340, or some function modules of the audio module 370 may be arranged in the processor 340.

The speaker 370A, also referred to as a "loudspeaker/horn", is configured to convert an audio electrical signal into a sound signal. A music or a hands-free call may be listened from the electronic device 300 through the speaker 370A.

The receiver 370B, also referred to as a "earpiece", is configured to convert an audio electrical signal into a sound signal. A call or a voice message is answered in the electronic device 300, the voice may be answered by placing the receiver 370B close to a human ear.

The microphone 370C, also referred to as a "voice tube", "mike", is configured to convert a sound signal into an electrical signal. When making a call or sending a voice message, the user may make a sound by inputting the sound signal into the microphone 370C by means of approaching the microphone 370C to the human mouth. The electronic device 300 may be arranged with at least one microphone 370C. In other embodiments, the electronic device 300 may be arranged with two microphones 370C, and the two microphones 370C may reduce a noise in addition to collecting a sound signal. In other embodiments, the electronic device 300 may further have three, four, or more microphones 370C to collect the sound signal, reduce noise, identify sound sources, and implement directional recording functions.

The pressure sensor 380A is configured to sense a pressure signal, and may convert the pressure signal into an electrical signal. In some embodiments, the pressure sensor 380A may be arranged on the display screen 394. There are many types of pressure sensors 380A, such as a resistive pressure sensor, an inductive pressure sensor, a capacitive pressure sensor, etc. A capacitive pressure sensor may include at least two parallel plates made of conductive material. A capacitance between electrodes changes when a force is applied to the pressure sensor 380A. The electronic device 300 determines the intensity of the pressure based on the change in the capacitance. When a touch operation acts on the display screen 394, the electronic device 300 detects the intensity of the touch operation according to the pressure sensor 380A. The electronic device 300 may also calculate a touched position according to a detection signal of the pressure sensor 380A. In some embodiments, touch operations acting on the same touch position but with different intensities may correspond to different operation instructions. In some embodiments, when a touch operation with the intensity less than a first pressure threshold acts on a short message application icon, an instruction for viewing the short message is executed. When a touch operation with the intensity greater than or equal to the first pressure threshold acts on the short message application icon, an instruction for creating a new short message is executed.

The gyroscope sensor 380B may be configured to determine a moving posture of the electronic device 300. In some embodiments, an angular velocity of the electronic device 300 about three axes (namely, x, y, and z axes) may be determined by the gyroscope sensor 380B. The gyroscope sensor 380B may be used for image stabilization. Exemplarily, when the shutter is pressed, the gyroscope sensor 380B detects a shaking angle of the electronic device 300, calculates a compensated distance of the lens module according to the angle, and allows the lens to counteract the shaking of the electronic device 300 through a reverse motion, so as to reduce the occurrence of the shaking of the electronic device 300. The gyroscope sensor 380B may also be used for navigation, somatic game scenarios, etc.

The air pressure sensor 380C is configured to measure an air pressure. In some embodiments, the electronic device 300 calculates an altitude through the air pressure value measured by the air pressure sensor 380C to assist in positioning and navigation.

The magnetic sensor 380D includes a Hall sensor. The electronic device 300 may detect an opening and closing state of a flip or a holster using the magnetic sensor 380D. In some embodiments, when the electronic device 300 is a flip device, the electronic device 300 may detect the opening and closing state of the flip by using the magnetic sensor 380D. Further, the electronic device 300 may be set to be automatically unlocked according to the detected opening and closing state of the flip or the holster.

The acceleration sensor 380E may detect a magnitude of an acceleration of the electronic device 300 in various directions (generally three axes). A magnitude and a direction of the gravity may be detected when the electronic device 300 is stationary. The acceleration sensor 380E may also be configured to identify a posture of the electronic device 300, and may be used in applications such as horizontal-vertical-screen switching, pedometers, etc.

The distance sensor 380F is configured to measure a distance. The electronic device 300 may measure the distance by an infrared or a laser. In some embodiments, when taking a picture/scene, the electronic device 300 may use the distance sensor 380F to measure the distance to achieve fast focusing.

The proximity light sensor 380G may include, for example, a light emitting diode (LED) and a light detector, such as a photodiode. The light emitting diode may be an infrared light emitting diode. The electronic device 300 emits infrared light to the outside by the light emitting diode. The electronic device 300 uses the photodiode to detect infrared reflected light from nearby objects. When sufficient reflected light is detected, it may be determined that there is an object near the electronic device 300. When insufficient reflected light is detected, the electronic device 300 may determine that there is no object near the electronic device 300. The electronic device 300 may use the proximity light sensor 380G to detect that the user holds the electronic device 300 in a position close to the ear to talk, so as to automatically turn off the screen to save power. The proximity light sensor 380G may also be configured to automatically unlock and lock the screen in a holster mode or a pocket mode.

The ambient light sensor 380L is configured to sense an ambient light brightness. The electronic device 300 may adaptively adjust the brightness of the display screen 394 according to the sensed ambient light brightness. The ambient light sensor 380L may also be configured to automatically adjust a white balance when taking a picture. The ambient light sensor 380L may also cooperate with the proximity light sensor 380G to detect whether the electronic device 300 is in a pocket to reduce the occurrence of accidental touch.

The fingerprint sensor 380H is configured to collect a fingerprint. The electronic device 300 may use characteristics of the collected fingerprint to realize fingerprint unlocking, access an application lock, take a picture with the fingerprint, answer an incoming call with the fingerprint, etc.

The temperature sensor 380J is configured to detect the temperature. In some embodiments, the electronic device 300 utilizes the temperature detected by the temperature sensor 380J to execute a temperature processing strategy. For example, when the temperature reported by the temperature sensor 380J exceeds a threshold value, the electronic device 300 may reduce a performance of the processor located near the temperature sensor 380J in order to reduce power consumption and implement thermal protection. In other embodiments, when the temperature is less than another threshold, the electronic device 300 heats the battery 342 to avoid abnormal shutdown of the electronic device 300 caused by the low temperature. In some other embodiments, when the temperature is less than a further threshold, the electronic device 300 boosts an output voltage of the battery 342 to avoid abnormal shutdown caused by the low temperature.

The touch sensor 380K is also referred to as a "touch panel". The touch sensor 380K may be disposed on the display screen 394, and the touch sensor 380K and the display screen 394 constitute a touch screen cooperatively, which is also called a "touch panel". The touch sensor 380K is configured to detect a touch operation on or near the touch sensor. The touch sensor may transmit the detected touch operation to the application processor to determine a type of touch event. A visual output related to the touch operation may be provided through the display screen 394. In other embodiments, the touch sensor 380K may also be disposed on a surface of the electronic device 300 in a position different from a position in which the display screen 394 is located.

The bone conduction sensor 380M may be configured to acquire a vibration signal. In some embodiments, the bone conduction sensor 380M may be configured to acquire the vibration signal of a vibrating bone of a vocal part of a human body. The bone conduction sensor 380M may also be configured to contact a pulse of the human body and receive a beating signal of a blood pressure. In some embodiments, the bone conduction sensor 380M may also be disposed in the earphone to obtain a bone conduction earphone. The audio module 370 may be configured to analyze the voice signal based on the vibration signal of the vibration bone of the vocal part obtained by the bone conduction sensor 380M, so as to realize the voice function. The application processor may be configured to analyze heart rate information based on the beating signal of the blood pressure obtained by the bone conduction sensor 380M, so as to realize the detection of heart rate.

The keys 390 include a power-on key, a volume key, etc. The keys 390 may be mechanical keys or touch keys. The electronic device 300 may receive key inputs and generate key signal inputs related to user settings and function control of the electronic device 300.

The motor 391 may generate a vibrating alert. The motor 391 may be configured to provide the vibrate alert for an incoming call, and may also be configured to provide a touch vibration feedback. For example, touch operations acting on different applications (such as taking a picture, playing an audio, etc.) may correspond to different vibration feedback effects. The motor 391 may also generate different vibration feedback effects for touch operations acting on different areas of the display screen 394. Different application scenarios (for example, reminding time, receiving information, alarm clock, games, etc.) may also correspond to different vibration feedback effects. The touch vibration feedback effects may also be customized.

The indicator 392 may be an indicator light, and may be configured to indicate a charging state, a power change, and may also be configured to indicate a message, a missed call, a notification, etc.

The SIM card interface 395 is configured to be connected a SIM card. The SIM card may be inserted into the SIM card interface 395 to contact with the electronic device 300 or pulled out from the SIM card interface 395 to separate from the electronic device 300. The electronic device 300 may support 1 or N SIM card interfaces, and N is a positive integer greater than 1. The SIM card interface 395 may support a Nano SIM card, a Micro SIM card, a SIM card, and so on. A plurality of cards may be inserted into the same SIM card interface 395 simultaneously. The types of the plurality of cards may be the same as each other or different from each other. The SIM card interface 395 may also be compatible with different types of SIM cards. The SIM card interface 395 may also be compatible with an external memory card. The electronic device 300 may interact with the network through the SIM card to realize functions such as calling and data communication. In some embodiments, the electronic device 300 may employ an eSIM, i.e., an embedded SIM card. The eSIM card may be embedded in the electronic device 300 and cannot be separated from the electronic device 300.

In a second part (Part II), the overall process method and implementation of key technical solutions provided in the embodiment of the present disclosure will be described as follows.

The data transfer method provided in some embodiments of the present disclosure may be divided into a triggering stage, a stage of determining the source device, a stage of determining the target device, and a data transfer stage, which will be described in sequence as follows.

In the triggering stage, all devices in the device group detect the user's triggering instruction, and different devices may have different triggering conditions. When the triggering instruction meets the triggering condition, a device starts or turns on a camera module of the device, and sends an instruction to other devices. The other devices may also start camera modules of the other devices after receiving the instruction.

In some embodiments, a mobile phone, which is served as the triggering device, may be taken for illustration. As shown in FIG. 2A, a triggering condition of the mobile phone may be a condition in which a state of a mobile phone body changes from a horizontal state to a perpendicular state within preset time, such as 2 seconds, and the mobile phone body faces the user. When the user changes the mobile phone from the horizontal state to the perpendicular state within 2 seconds, and a screen of the mobile phone faces a front of the user, the mobile phone may determine that a triggering instruction, which meets a triggering condition of the mobile phone, is received. In this case, the mobile phone starts a camera of the mobile phone, and sends an instruction for starting cameras of the other devices to other devices.

Figure 2B:
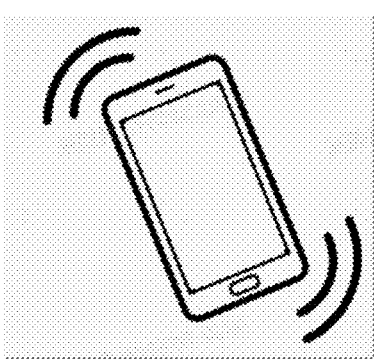
FIG. 2B is a schematic diagram of another triggering mode according to some embodiments of the present disclosure.

In some embodiments, as shown in FIG. 2B, the triggering condition of the mobile phone may be a shaking of the mobile phone body. After the user picks up the mobile phone and shakes the mobile phone, the mobile phone may determine that a triggering instruction, which meets a triggering condition of the mobile phone, is received. In this case, the mobile phone starts a camera of the mobile phone, and sends an instruction for starting cameras of the other devices to other devices.

It may be understood that the triggering device described in the above-mentioned triggering stage may be any one of the devices in the device group, and the different devices may have the different triggering conditions. The above-mentioned examples are merely illustrative, which do not represent the limitation of the present disclosure.

Through a process of the triggering stage, it may be possible to reduce an occurrence that the device remains the camera module turned on all the time, and the camera module may be turned on only when the user has requirement of data transfer, so as to save the power consumption of the device.

In the stage of determining the source device, the all devices in the device group begin to collect images in a preset period. After the collection is completed, there may be two processing ways as follows. A first processing way is that each device sends image data collected by the each device to the identifying device. A second processing way is that the each device performs an identifying processing for the image data collected by the each device, obtains a first gesture confidence corresponding to the each device, and sends all first gesture confidences to the identifying device for sorting processing. The identifying device may be any one of the devices in the device group, such as a device with a strongest computing power. The identifying device may determine that a device, which corresponds to a first gesture confidence with a highest confidence, is the source device.

Figure 2C:
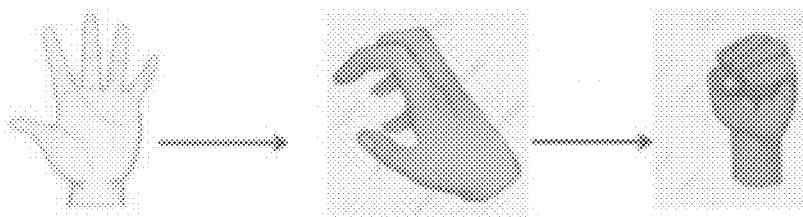
FIG. 2C is a schematic diagram of determining a first gesture of a source device according to some embodiments of the present disclosure.

The first gesture may be a palm gripping action, as shown in FIG. 2C. During an identifying process, in order to reduce the amount of calculation, the first gesture confidence may be divided into a confidence of identifying the palm and a confidence of identifying a fist after identifying the palm.

In the first processing way, the identifying device may identify the image data collected by the each device by means of using a neural internetwork model, and determine that the device, which corresponds to the image data with a highest probability of showing the first gesture in the image, is the source device, which will not be repeated herein.

Figure 2D:
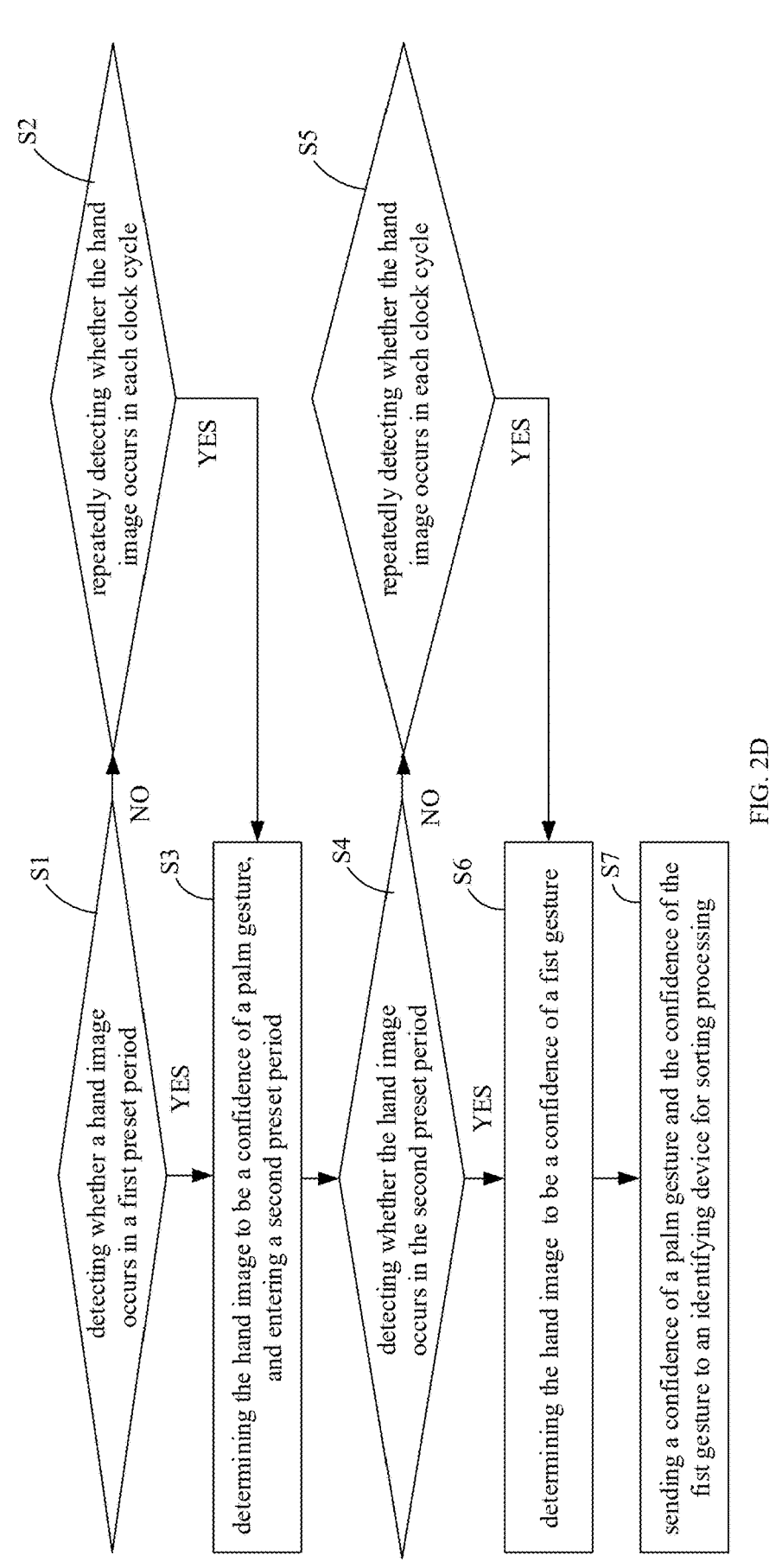
FIG. 2D is a flowchart of determining the source device according to some embodiments of the present disclosure.

In the second processing way, in order to facilitate the understanding, a processing flow of any one of the devices may be taken as an example. As shown in FIG. 2D, after entering the stage of determining the source device, the processing flow may include the following operations.

In an operation S1, it is detected whether a hand image occurs in a first preset period. In a case where the hand image is detected, an operation S3 is performed. In a case where the hand image is not detected, an operation S2 is performed.

In the operation S2, it is repeatedly detected whether the hand image occurs in each clock cycle. In a case where the hand image is detected before an end of the first preset period, the operation S3 is performed. In a case where the hand image is not detected at the end of the first preset period, the first gesture confidence is determined to be 0.

In the operation S3, the hand image is determined to be a confidence of a palm gesture. A second preset period is entered.

In an operation S4, it is detected whether a hand image occurs in the second preset period. In a case where the hand image is detected, an operation S6 is performed. In a case where the hand image is not detected, an operation S5 is performed.

In an operation S5, it is repeatedly detected whether the hand image occurs in each clock cycle. In a case where the hand image is detected before an end of the second preset period, the operation S6 is performed. In a case where the hand image is not detected at the end of the second preset period, the first gesture confidence is determined to be 0.

In the operation S6, the hand image is determined to be a confidence of a fist gesture.

In an operation S7, the confidence of the palm gesture and the confidence of the fist gesture are sent to the identifying device for sorting processing.

Afterwards (such as after the operation S7), the identifying device may select or filter out a device, which corresponds to an image with a highest comprehensive confidence, to serve as the source device.

The confidence may be determined according to an angle of the gesture and a proportion of the gesture occupying in a picture. For a real source device, a gesture without large deviation angle may be generally identified, and the proportion of the gesture occupying in a picture is generally largest. Therefore, the first gesture confidence may be determined according to the above-mentioned rule.

It can be seen that the calculation amount of the identifying device may be reduced by using the second processing way, so as to improve the identification efficiency.

It should be noted that after the source device is determined, prompting information may be generated by the source device. The prompting information is configured to prompt the user that the target content is ready to be transferred. The promotion information may be any one of formats, such as text, images, videos, voice, etc., and may be displayed in any one of the above-mentioned formats, which is not limited herein. By generating the promotion information, the user may be informed of a status of the source device, which is convenient for the user to designate the target device through the gesture.

In some embodiments, different prompting information may be generated according to different source devices and different target devices. For example, the data may be transferred from the mobile phone to a TV, and a special effect interface may be generated on the mobile phone. The special effect interface may include, but not limited to, zooming of a display interface, adding text annotation, voice broadcasting, etc., which is not specifically limited herein.

In some embodiments, different prompting information may be generated according to different types of data currently transferred by the source device. A data type may include a projection application, a display application, an interactive application, etc., which is not specifically limited herein.

In addition, the source device may send an instruction, which prepares to receive a second gesture, to other devices other than itself. In some embodiments, the source device may obtain information of the all devices in the device group through the device management system, and then send the instruction, which prepares to receive the second gesture, to the other devices other than itself. The instruction may enable the other devices to extend starting time of camera modules thereof, that is, a third preset period and a fourth preset period are entered.

In the stage of determining the target device, the device in the device group other than the source device begin to collect the image in the third preset period and the fourth preset period. After the collection is completed, there may be two processing ways as follows. A first processing way is that each device sends image data collected by the each device to the identifying device. A second processing way is that is that the each device performs an identifying processing for the image data collected by the each device, obtains a second gesture confidence corresponding to the each device, and sends all second gesture confidences to the identifying device for sorting processing. The identifying device may be any one of the devices in the device group, such as a device with a strongest computing power. The identifying device may determine that a device, which corresponds to a second gesture confidence with a highest confidence, is the source device.

Figure 2E:
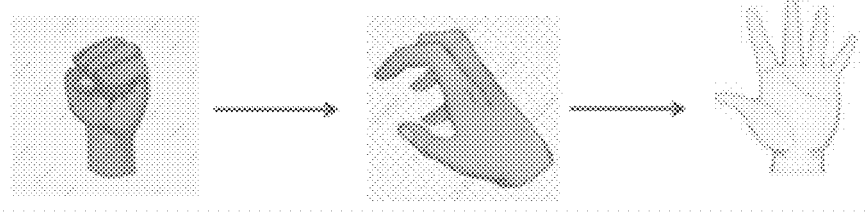
FIG. 2E is a schematic diagram of determining a second gesture of a target device according to some embodiments of the present disclosure.
Figure 2F:
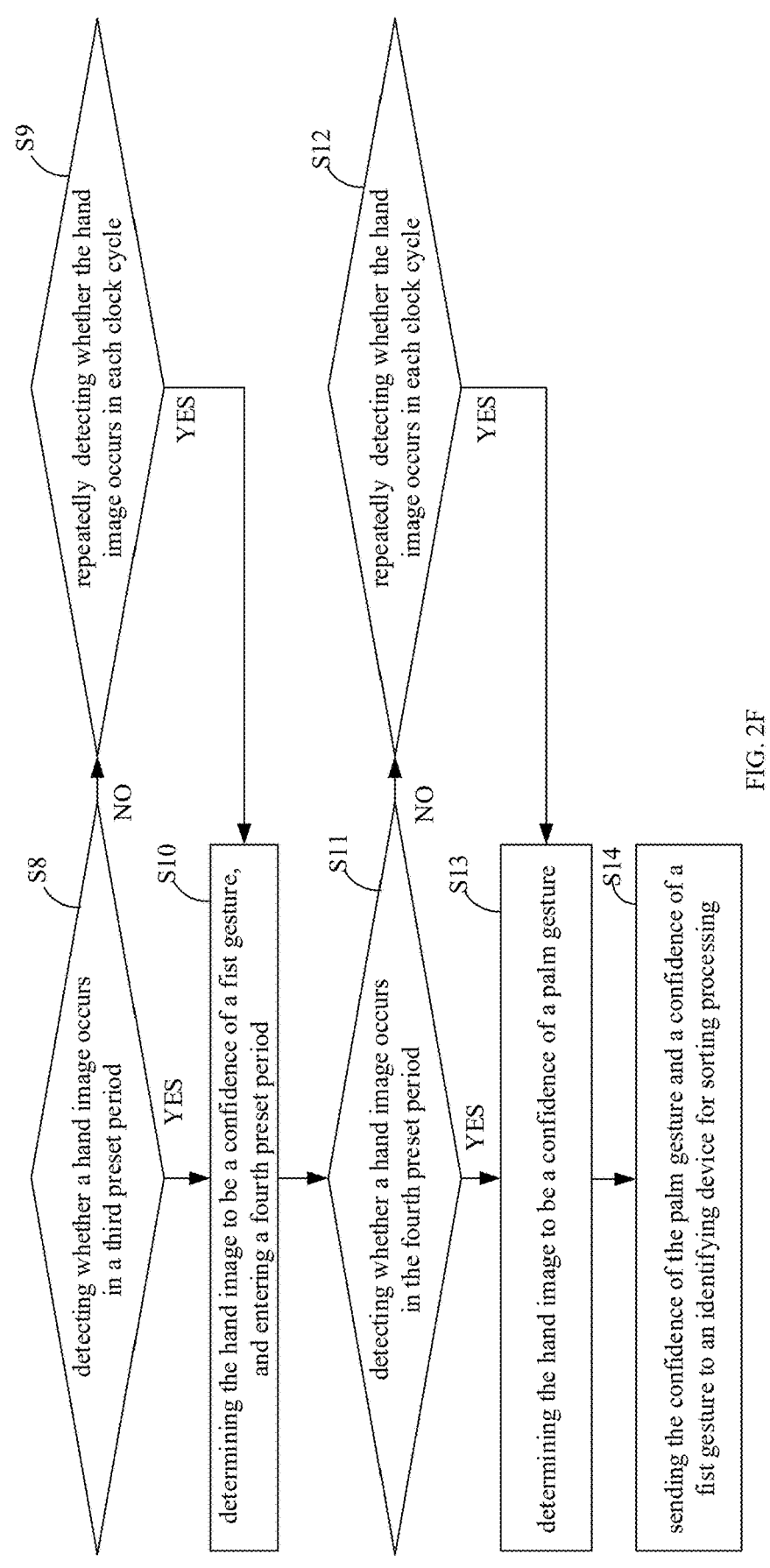
FIG. 2F is a flowchart of determining the target device according to some embodiments of the present disclosure.

The second gesture may be an action of a palm being spread open, as shown in FIG. 2E. During an identifying process, in order to reduce the amount of calculation, the second gesture confidence may be divided into a confidence of identifying the fist and a confidence of identifying the palm after identifying the fist.

In the first processing way, the identifying device may identify the image data collected by the each device by means of using a neural internetwork model, and determine that the device, which corresponds to the image data with a highest probability of showing the second gesture in the image, is the target device, which will not be repeated herein.

In the second processing way, in order to facilitate the understanding, a processing flow of any one of the devices may be taken as an example. As shown in FIG. 2D, after entering the stage of determining the target device, the processing flow may include the following operations.

In an operation S8, it is detected whether a hand image occurs in the third preset period. In a case where the hand image is detected, an operation S10 is performed. In a case where the hand image is not detected, an operation S9 is performed.

In the operation S9, it is repeatedly detected whether the hand image occurs in each clock cycle. In a case where the hand image is detected before an end of the second preset period, the operation S10 is performed. In a case where the hand image is not detected at the end of the second preset period, the first gesture confidence is determined to be 0.

In the operation S10, the hand image is determined to be a confidence of a fist gesture. The fourth preset period is performed.

In an operation S11, it is detected whether a hand image occurs in the fourth preset period. In a case where the hand image is detected, an operation S13 is performed. In a case where the hand image is not detected, an operation S12 is performed.

In the operation S12, whether the hand image occurs in each clock cycle is repeatedly detected. In a case where the hand image is detected before an end of the fourth preset period, the operation S13 is performed. In a case where the hand image is not detected at the end of the fourth preset period, the second gesture confidence is determined to be 0.

In the operation S13, the hand image is determined to be a confidence of a palm gesture.

In an operation S14, the confidence of the palm gesture and the confidence of the fist gesture are sent to the identifying device for sorting processing.

Afterwards (such as after the operation S14), the identifying device may select a device, which corresponds to an image with a highest comprehensive confidence, to serve as the target device.

Similarly, the confidence may be determined according to an angle of the gesture and a proportion of the gesture occupying in a picture. For a real source device, a gesture without too large deviation angle may be generally identified, and the proportion of the gesture occupying in a picture is generally largest. Therefore, the second gesture confidence may be determined according to the above-mentioned rule.

It can be seen that the source device and the target device may be determined through the gesture. The device does not need to be equipped with an additional hardware, and may transfer the data in a long distance, such that the user experience may be greatly improved.

In the data transfer stage, after the source device and target device are determined, the camera modules of the all devices may be turned off, and a specific process of data transfer may be started.

In some embodiments, the source device may firstly cancel the prompting information, and then perform different data transfer strategies according to a currently running data type. For example, when the current data type is a projection application or a display type, the source device may capture an interface currently displayed, generate a special effect of interface transfer, and transfer the interface to the target device for display. After the transferring is completed, the source device may continue to remain a displaying state or stop to display. In a case where the current data type is an interactive application and there is an application on the target device which is compatible with an application currently running on the source device, the source device may generate the special effect of interface transfer and transfer the interface to the target device, the target device may display the interface synchronously, and the source device may close the application after the transferring is completed.

Figures 2G, 2H:
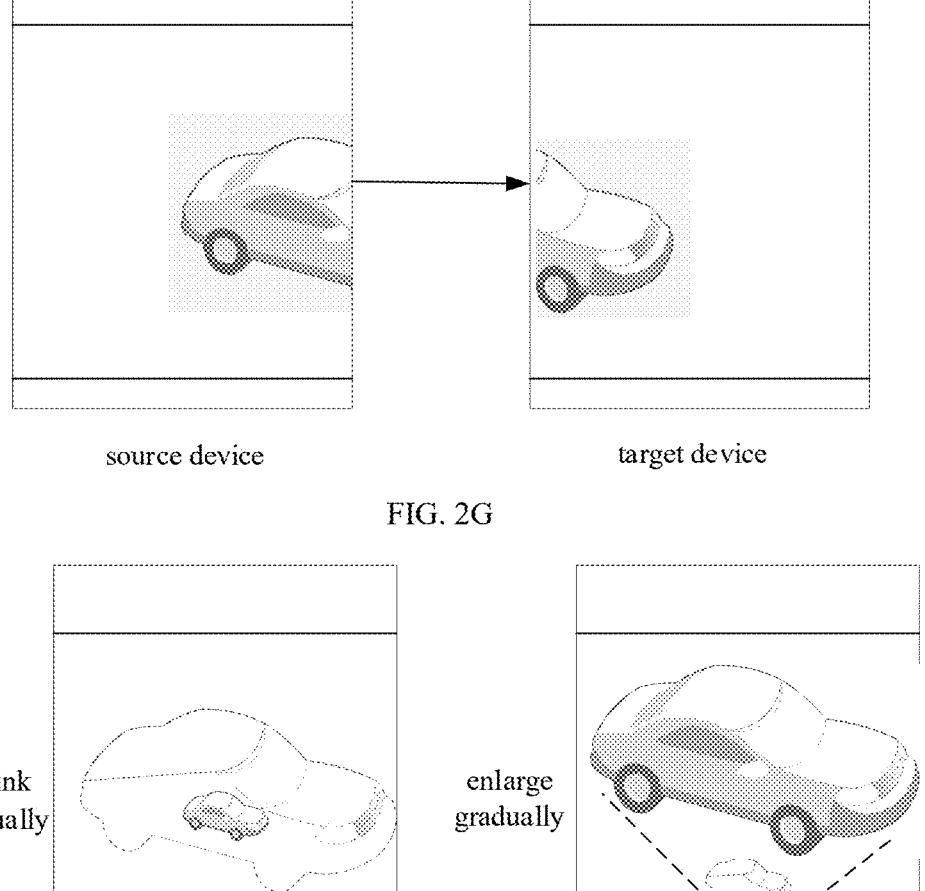
FIG. 2G is a schematic diagram of an interface of a data transfer method according to some embodiments of the present disclosure.
FIG. 2H is a schematic diagram of an interface of another data transfer method according to some embodiments of the present disclosure.

The special effect of data transfer provided in some embodiments of the present disclosure will be described with reference to FIG. 2G and FIG. 2H. As shown in FIG. 2G, the source device may generate the special effect of transferring an interface to be transferred to the target device, and the target device may also synchronously generate the special effect of the interface to be transferred entering the target device. As shown in FIG. 2H, the source device may gradually zoom out or shrink the interface to be transferred until the interface disappears, and the target device may synchronously enlarge the interface to be transferred gradually until the interface is displayed normally.

It can be understood that the above-mentioned special effect of the data transfer may include various ways. To facilitate understanding, the above-mentioned examples are used to illustrate and do not represent limitations on the data transfer method of the present disclosure.

Through the above-mentioned method, the source device and target device may be automatically determined according to the user's gesture, so as to achieve the long-distance data transfer, thereby greatly improving the user experience.

In the third part (Part III), the scope protection of the claims of the present disclosure may be described as follows.

As shown in FIG. 3. FIG. 3 is a flowchart of a data transfer method according to some embodiments of the present disclosure, and the data transfer method includes the following operations.

In an operation 301, camera modules of N devices are controlled to collect/acquire first image data in response to a triggering instruction.

N is a natural number greater than or equal to 2. The N devices may be devices in the home and share a same user account. The first image data may be an image or a video composed of a set of images.

In an operation 302, a source device in the N devices is determined based on the first image data.

In in an operation 303, camera modules of N-1 devices other than the source device are controlled to collect second image data.

The second image data may be an image or a video composed of a set of images.

In an operation 304, a target device in the N-1 devices is determined based on the second image data.

In an operation 305, the source device is controlled for transferring a target content to the target device.

In some embodiments, the operation of the determining a source device in the N devices based on the first image data includes the following operations: performing a first identifying processing for the first image data collected/acquired by the N devices, and obtaining first gesture confidences of the first image data; and determining a device, which corresponds to a first gesture confidence with a highest confidence in the first gesture confidences, to be the source device.

In some embodiments, the operation of the determining a target device in the N-1 devices based on the second image data includes the following operations: receiving first gesture confidences generated by the N devices according to the first image data; and performing a sorting processing for the first gesture confidences, and determining a device, which corresponds to a first gesture confidence with a highest confidence in the first gesture confidences, to be the source device In some embodiments, the operation of the determining a target device in the N-1 devices based on the second image data includes the following operations: performing a second identifying processing for second image data collected by the N-1 devices, and obtaining second gesture confidences of the second image data; and determining a device, which corresponds to a second gesture confidence with a highest confidence in the second gesture confidences, to be the source device In some embodiments, the operation of the determining a target device in the N-1 devices based on the second image data includes the following operations: receiving second gesture confidences generated by the N-1 devices according to the second image data; and performing a sorting processing for the second gesture confidences, and determining a device, which corresponds to a second gesture confidence with a highest confidence in the second gesture confidences, to be the source device In some embodiments, the operation of the controlling the source device for transferring the target content to the target device includes the following operations: obtaining an application type of the target content; and transferring the target content to the target device for displaying according to a preset transfer rule corresponding to the application type.

As shown in FIG. 4, FIG. 4 is a flowchart of another data transfer method according to some embodiments of the present disclosure, and the data transfer method includes the following operations.

In an operation 401, a target content is output by a source device.

The source device is a sending device of the target content, which is determined by an identifying device according to first data generated by N devices, N is a natural number greater than or equal to 2, the N devices include the identifying device, the source device, and a target device, any two devices of the N devices communicate with each other, and the identifying device is any one of the N devices. The target content may be streaming media information, which may include, but not limited to, any one or any combination of an image, a text, a video, and an audio. The first data may be first image data or a first gesture confidence.

In an operation 402, the target content is sent to the target device by the source device.

The target device is a receiving device of the target content, which is determined by the identifying device according to second data generated by the N devices. The second data may be second image data or a second gesture confidence.

When the identifying device is the source device, there are some embodiments as follows.

In some embodiments, before the target content is output by the source device, the method further includes: determining, by the source device, itself to be the sending device of the target content, in a case where a first data packet includes first image data. In addition, the operation of the determining, by the source device, itself to be the sending device of the target content may include the following operations: collecting, by the source device, the first image data through a camera module, and receiving, by the source device, the first image data from N-1 devices other than the source device; performing, by the source device, a first identifying processing for the first image data, and determining first gesture confidences of the first image data; selecting, by the source device, a first gesture confidence with a highest confidence in the first gesture confidences;

and determining, by the source device, itself to be a device corresponding to the first gesture with the highest confidence.

In some embodiments, before the target content is output by the source device, the method further includes: determining, by the source device, itself to be the sending device of the target content, in a case where a first data packet includes a first gesture confidence. In addition, the operation of the determining, by the source device, itself to be the sending device of the target content may include the following operations: performing, by the source device, a first identifying processing for first image data collected by the source device, obtaining, by the source device, first gesture confidences, and receiving, by the source device, the first gesture confidences from N-1 devices other than the source device; performing, by the source device, a sorting processing for the first gesture confidences; and determining, by the source device, itself to be a device corresponding to the first gesture with a highest confidence.

In some embodiments, before the target content is sent to the target device by the source device, the method further includes: determining, by the source device, the target device to be the receiving device of the target content, in a case where a second data packet includes second image data. In addition, the operation of the determining, by the source device, the target device to be the receiving device of the target content may include the following operations: receiving, by the source device, the second image data from the N-1 devices other than the source device; performing, by the source device, a second identifying processing for the second image data, and determining second gesture confidences of the second image data; selecting, by the source device, a second gesture confidence with a highest confidence in the second gesture confidences; and determining, by the source device, a device, which corresponds to the second gesture with a highest confidence, to be the target device.

In some embodiments, before the target content is sent to the target device by the source device, the method further includes: determining, by the source device, the target device to be the receiving device of the target content, in a case where a second data packet includes a second gesture confidence. In addition, the operation of the determining, by the source device, the target device to be the receiving device of the target content may include the following operations: receiving, by the source device, second gesture confidences from the N-1 devices other than the source device; performing, by the source device, a sorting processing for the second gesture confidences; and determining, by the source device, a device, which corresponds to the second gesture with a highest confidence, to be the target device.

When the identifying device is the target device, there are some embodiments as follows.

In some embodiments, before the target content is output by the source device, the method further includes: determining, by the target device, the source device to be the sending device of the target content, in a case where a first data packet includes first image data. In addition, the operation of the determining, by the target device, the source device to be the sending device of the target content may include the following operations: collecting, by the target device, the first image data through a camera module, and receiving, by the target device, the first image data from N-1 devices other than the target device; performing, by the target device, a first identifying processing for the first image data, and determining first gesture confidences of the first image data; selecting, by the target device, a first gesture confidence with a highest confidence in the first gesture confidences; and determining, by the target device, a device, which corresponds to the first gesture with the highest confidence, to be the source device.

In some embodiments, before the target content is output by the source device, the method further includes: determining, by the target device, the source device to be the sending device of the target content, in a case where a first data packet includes a first gesture confidence. In addition, the operation of the determining, by the target device, the source device to be the sending device of the target content may include the following operations: performing, by the target device, a first identifying processing for first image data collected by the target device, obtaining first gesture confidences, and receiving, by the target device, the first gesture confidences from N-1 devices other than the target device; performing, by the target device, a sorting processing for the first gesture confidences; and determining, by the target device, a device, which corresponds to the first gesture with a highest confidence, to be the source device.

In some embodiments, before the target content is sent to the target device by the source device, the method further includes: determining, by the target device, itself to be the receiving device of the target content, in a case where a second data packet includes second image data. In addition, the operation of the determining, by the target device, itself to be the receiving device of the target content may include the following operations: collecting, by the target device, the second image data through a camera module, and receiving, by the target device, the second image data from N-2 devices other than the source device and itself; performing, by the target device, a second identifying processing for the second image data, and determining second gesture confidences of the second image data; selecting, by the target device, a second gesture confidence with a highest confidence in the second gesture confidences; and determining, by the target device, itself to be a device corresponding to the second gesture with the highest confidence.

In some embodiments, before the target content is sent to the target device by the source device, the method further includes: determining, by the target device, itself to be the receiving device of the target content, in a case where a second data packet includes a second gesture confidence. In addition, the operation of the determining, by the target device, itself to be the receiving device of the target content may include the following operations: performing, by the target device, a second identifying processing for second image data collected by the target device, obtaining second gesture confidences, and receiving, by the target device, the second gesture confidences from N-2 devices other than the source device and itself; performing, by the target device, a sorting processing for the second gesture confidences; and determining, by the target device, itself to be a device corresponding to the second gesture with a highest confidence.

When the identifying device is a first device, the first device is any one of the N devices other than the source device and the target device, there are some embodiments as follows.

In some embodiments, before the target content is output by the source device, the method further includes: determining, by the first device, the source device to be the sending device of the target content, in a case where a first data packet includes first image data. In addition, the operation of the determining, by the first device, the source device to be the sending device of the target content may include the following operations: collecting, by the first device, the first image data through a camera module, and receiving, by the first device, the first image data from N-1 devices other than the first device; performing, by the first device, a first identifying processing for the first image data, and determining first gesture confidences of the first image data; selecting, by the first device, a first gesture confidence with a highest confidence in the first gesture confidences; and determining, by the first device, a device, which corresponds to the first gesture with the highest confidence, to be the source device.

In some embodiments, before the target content is output by the source device, the method further includes: determining, by the first device, the source device to be the sending device of the target content, in a case where a first data packet includes a first gesture confidence. In addition, the operation of the determining, by the first device, the source device to be the sending device of the target content may include the following operations: performing, by the first device, a first identifying processing for first image data collected by the first device, obtaining first gesture confidences, and receiving, by the first device, the first gesture confidences from N-1 devices other than the first device; performing, by the first device, a sorting processing for the first gesture confidences; and determining, by the first device, a device, which corresponds to the first gesture with a highest confidence, to be the source device.

In some embodiments, before the target content is sent to the target device by the source device, the method further includes: determining, by the first device, the target device to be the receiving device of the target content, in a case where a second data packet includes second image data. In addition, the operation of the determining, by the first device, the target device to be the receiving device of the target content may include the following operations: collecting, by the first device, the second image data through a camera module, and receiving, by the first device, the second image data from N-2 devices other than the source device and itself; performing, by the first device, a second identifying processing for the second image data, and determining second gesture confidences of the second image data; selecting, by the first device, a second gesture confidence with a highest confidence in the second gesture confidences; and determining, by the first device, a device, which corresponds to the second gesture with the highest confidence, to be the target device.

In some embodiments, before the target content is sent to the target device by the source device, the method further includes: determining, by the first device, the target device to be the receiving device of the target content, in a case where a second data packet includes a second gesture confidence. In addition, the operation of the determining, by the first device, the target device to be the receiving device of the target content may include the following operations: performing, by the first device, a second identifying processing for second image data collected by the first device, obtaining second gesture confidences, and receiving, by the first device, the second gesture confidences from N-2 devices other than the source device and itself; performing, by the first device, a sorting processing for the second gesture confidences; and determining, by the first device, a device, which corresponds to the second gesture with a highest confidence, to be the target device.

In some embodiments, before the target content is output by the source device, the method further includes: starting, by a triggering device, a camera module of the triggering device according to the triggering instruction, and sending, by a triggering device, a first image-capturing instruction to at least one device of the N devices. The first image-capturing instruction is configured to enable the at least one device to start a camera module of the at least one device, and the triggering device is any one of the N devices.

In some embodiments, the operation of the starting, by the triggering device, the camera module of the triggering device according to the triggering instruction, and sending the first image-capturing instruction to at least one device of the N devices may include the following operations: starting, by the triggering device, the camera module of the triggering device, in a case where a triggering instruction, which meets a preset triggering condition, is received by the triggering device; obtaining, by the triggering device, a current working state of N-1 devices other than the triggering device, where the working state includes a running state and a non-running state; selecting, by the triggering device, a device in the running state from the N-1 devices; and sending, by the triggering device, the first image-capturing instruction to the device in the running state.

In some embodiments, before the target content is sent to the target device by the source device, the method further includes: sending, by the triggering device, a second image-capturing instruction to N-1 devices other than itself. The second image-capturing instruction is configured to enable the camera modules of the N-1 devices to remain in a starting state.

It can be seen that through the above-mentioned methods, the source device and the target device may be determined by means of identifying the images collected by the all devices, and it is not necessary to be equipped with the additional hardware. Therefore, it may be possible to achieve the transfer of the streaming media information between the devices that meet the user's needs, such that the user's interaction experience may be greatly improved.

The above-mentioned mainly introduces the scheme of some embodiments of the present disclosure from the perspective of the performing process on the method side. It can be understood that in order to realize the above-mentioned functions, the electronic device includes a corresponding hardware structure and/or software module for executing each function. Those skilled in the art should easily realize that, in combination with the units and algorithm operation of each example described in the embodiments provided herein, the embodiments of the present disclosure can be realized in the form of the hardware or a combination of the hardware and a computer software. Whether a function is executed by the hardware or the computer software driven the hardware depends on the specific application and design constraints of the technical solution. Professionals and technicians can use different methods for each specific application to realize the described functions, but such implementation should not be considered beyond the scope of the present disclosure.

In some embodiments of the present disclosure, the electronic device may be divided into function units according to the foregoing method examples. For example, each function unit may be divided corresponding to each function, or two or more functions may be integrated into one processing unit. The aforementioned integrated unit may be implemented in a form of hardware, or may also be implemented in a form of software function unit. It should be noted that the division of units in some embodiments of the present disclosure is schematic, is only a logical function division, and there may be other division manners in actual implementation.

Figure 5:
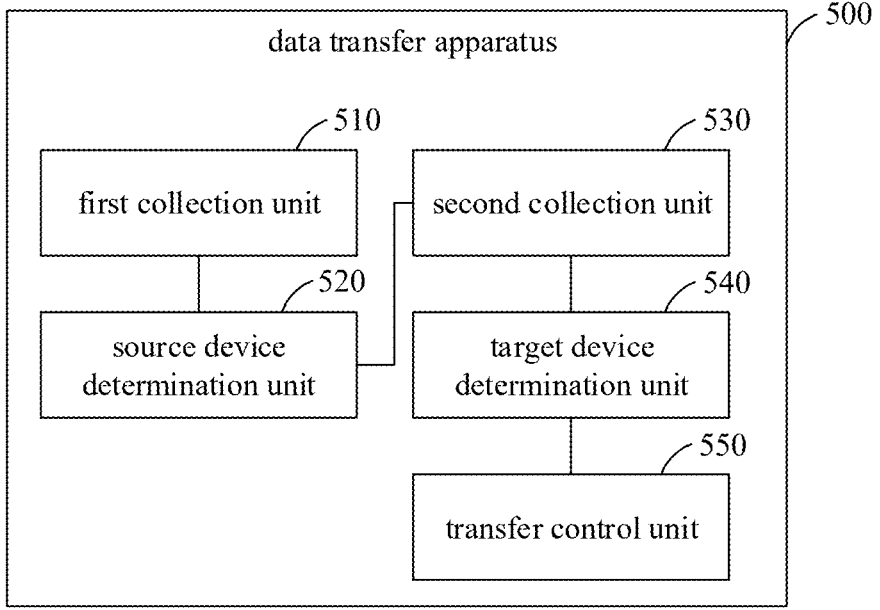
FIG. 5 is a block diagram of a functional unit composition of a data transfer apparatus according to some embodiments of the present disclosure.

In the case that each function module is divided according to each function, FIG. 5 shows a possible schematic structural diagram of the image synthesis apparatus involved in the aforesaid embodiments. As shown in FIG. 5, the image synthesis apparatus 500 includes a first collection unit 510, a source device determination unit 520, a second collection unit 530, a target device determination unit 540, and a transfer control unit 550.

The first collection unit 510 is configured to control camera modules of N devices to collect first image data in response to a triggering instruction. N is a natural number greater than or equal to 2.

The source device determination unit 520 is configured to determine a source device in the N devices based on the first image data.

The second collection unit 530 is configured to control camera modules of N-1 devices other than the source device to collect second image data.

The target device determination unit 540 is configured to determine a target device in the N-1 devices based on the second image data.

The transfer control unit 550 is configured to control the source device for transferring a target content to the target device.

Figure 6:
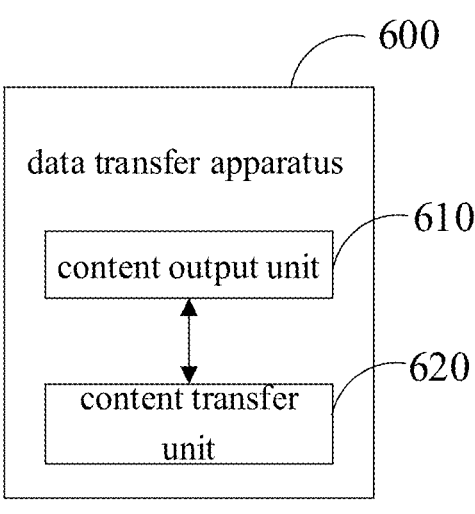
FIG. 6 is a block diagram of a functional unit composition of another data transfer apparatus according to some embodiments of the present disclosure

In the case that each function module is divided by a corresponding function, the following is a detailed description of another data transfer apparatus in some embodiments of the present disclosure in combination with FIG. 6. FIG. 6 is a block diagram of a functional unit composition of another data transfer apparatus 600 according to some embodiments of the present disclosure, and the data transfer apparatus 600 includes a content output unit 610 and a content transfer unit 620.

The content output unit 610 is configured to enable the source device to output the target content. The source device is a sending device of the target content, which is determined by an identifying device according to first data generated by N devices, N is a natural number greater than or equal to 2, the N devices include the identifying device, the source device, and a target device, any two devices of the N devices communicate with each other, and the identifying device is any one of the N devices.

The content transfer unit 620 is configured to enable the source device to send the target content to the target device. The target device is a receiving device of the target content, which is determined by the identifying device according to second data generated by the N devices.

All relevant contents of the operations involved in the aforesaid method embodiments may be cited in the descriptions of the functions of the corresponding function modules, which will not be repeated here.

It may be understood that since the method embodiments and the apparatus embodiments are different presentation forms of the same technical concept, the content of the method embodiments in the present disclosure should be synchronously adapted to the apparatus embodiments, which will not be repeated herein. The data transfer apparatus 500 and the data transfer apparatus 600 may perform all the data transfer methods included in the above-mentioned embodiments.

Some embodiments of the present disclosure further provide a computer storage medium. The computer storage medium stores a computer program for an exchange of electronic data. The computer program causes a computer to perform part or all of the operations of any one of the methods described in the aforesaid method embodiments, and the aforesaid computer includes an electronic device.

Some embodiments of the present disclosure further provide a computer program product. The computer program product includes a non-transitory computer-readable storage medium storing a computer program, and the computer program is operable to cause a computer to perform part or all of the operations of any one of the methods described in the aforesaid method embodiments. The computer program product may be a software installation package, and the computer includes an electronic device.

It should be noted that, for the foregoing method embodiments, for the sake of brevity, the method embodiments are all described as a combination of a series of actions or operations. However, those skilled in the art should understand that the present disclosure is not limited by a sequence of the actions or operations described here. Some operations may be performed in other sequences or simultaneously in accordance with the present disclosure. Those skilled in the art should also understand that some embodiments described in the specification are all optional embodiments, and the actions and the modules involved are not necessarily required by the present disclosure.

In the aforementioned embodiments, the description of each embodiment has its own emphasis. For the parts that are not described in detail in a certain embodiment, reference may be made to the relevant descriptions of other embodiments.

In several embodiments provided in the present disclosure, it should be understood that the disclosed apparatus may be implemented in other ways. For example, the device embodiments described above are merely illustrative. For example, the division of the above units is only a logical function division. In actual implementation, there may be another division manner. For example, multiple units or components may be combined or integrated into another system, or some features can be ignored or not executed. In addition, the mutual coupling or direct coupling or communication connection shown or discussed may be an indirect coupling or communication connection through some interfaces, devices or units, and may be electrical or in other forms.

The units described above as separate components may or may not be physically separated, and the components illustrated as units may or may not be physical units. The units may be located in one place, or may be distributed to multiple network units. Some or all of the units may be selected according to actual needs to achieve the purpose of a solution of the embodiments.

In addition, each functional unit in each embodiment of the present disclosure may be integrated into one processing unit, or each unit may exist physically separately. Alternatively, two or more units may also be integrated into one unit. The above integrated unit can be implemented in the form of hardware or in the form of a software functional unit.

The above-described integrated unit may be stored in a computer-readable memory when the integrated unit is implemented in the form of a software functional module and sold or used as a standalone product. Based on such understanding, the technical solution of the present disclosure, in essence or the contribution to the prior art, or all or part of the technical solution may be embodied in the form of a software product. The software product may be stored in a memory. The software product may include a number of instructions causing a computer device (the computer device may be a personal computer, a server or a network device, and the like) to perform all or parts of the operations of the above-described methods of various embodiments of the present disclosure. The foregoing memory may include various media which are able to store program codes. The media may include a U disk, a Read-Only Memory (ROM), a Random Access Memory (RAM), a removable hard disk, a magnetic disk, an optical disk, and the like.

Those skilled in the art may understand that all or part of the various methods of the above embodiments may be completed by related hardware instructed by a program. The program may be stored in a computer-readable memory. The memory may include a flash drive, a ROM, a RAM, a disk, an optical disk, and the like.

The embodiments of the present disclosure have been described in detail above. The principles and implementations of the present disclosure are described in the specific examples. The description of the above embodiments is only used to help understanding the methods of the present disclosure and the core ideas. For those skilled in the art, there will have a change in the specific embodiments and the application scope of present disclosure according to the idea of the present disclosure. In summary, the content of the present specification should not be construed as limiting the present disclosure.

What is claimed is:

1. A data transfer method, comprising:
controlling camera modules of N devices to collect first image data, wherein N is a natural number greater than or equal to 2;
determining a source device in the N devices based on the first image data;
controlling camera modules of N-1 devices other than the source device to collect second image data;
determining a target device in the N-1 devices based on the second image data; and
controlling the source device for transferring a target content to the target device;
wherein before controlling the source device for transferring a target content to the target device, the method further comprises:
generating, by the source device, prompting information, wherein the prompting information is configured to prompt a user that the target content is ready to be transferred; or
wherein before controlling camera modules of N devices to collect first image data, the method further comprises:
starting, by a triggering device, a camera module of the triggering device, and sending, by the triggering device, a first image-capturing instruction to at least one device of the N devices, wherein the first image-capturing instruction is configured to enable the at least one device to start a camera module of the at least one device, and the triggering device is any one of the N devices; or
wherein before controlling camera modules of N-1 devices other than the source device to collect second image data, the method further comprises:
sending, by the source device, a second image-capturing instruction to N-1 devices other than itself, wherein the second image-capturing instruction is configured to enable the camera modules of the N-1 devices to remain in a starting state.

2. The method according to claim 1, wherein the determining a source device in the N devices based on the first image data, comprises:
performing a first identifying processing for the first image data collected by the N devices, and obtaining first gesture confidences of the first image data; and
determining a device, which corresponds to a first gesture confidence with a highest confidence in the first gesture confidences, to be the source device; and/or the determining a target device in the N-1 devices based on the second image data, comprises:
receiving first gesture confidences generated by the N devices according to the first image data; and
performing a sorting processing for the first gesture confidences, and determining a device, which corresponds to a first gesture confidence with a highest confidence in the first gesture confidences, to be the source device.

3. The method according to claim 1, wherein the determining a target device in the N-1 devices based on the second image data, comprises:
performing a second identifying processing for second image data collected by the N-1 devices, and obtaining second gesture confidences of the-second image data; and
determining a device, which corresponds to a second gesture confidence with a highest confidence in the second gesture confidences, to be the source device; and/or
the determining a target device in the N-1 devices based on the second image data, comprises:
receiving second gesture confidences generated by the N-1 devices according to the second image data; and
performing a sorting processing for the second gesture confidences, and determining a device, which corresponds to a second gesture confidence with a highest confidence in the second gesture confidences, to be the source device.

4. The method according to claim 1, wherein the controlling the source device for transferring the target content to the target device, comprises:
obtaining an application type of the target content; and
transferring the target content to the target device for displaying according to a preset transfer rule corresponding to the application type.

5. A data transfer method, comprising:
outputting, by a source device, a target content, wherein the source device is a sending device of the target content, which is determined by an identifying device according to first data generated by N devices, N is a natural number greater than or equal to 2, the N devices comprise the identifying device, the source device, and a target device, any two devices of the N devices communicate with each other, and the identifying device is any one of the N devices; and
sending, by the source device, the target content to the target device, wherein the target device is a receiving device of the target content, which is determined by the identifying device according to second data generated by the N devices;
wherein before sending, by the source device, the target content to the target device, the method further comprises:
generating, by the source device, prompting information, wherein the prompting information is configured to prompt a user that the target content is ready to be transferred; or
wherein before outputting, by the source device, the target content, the method further comprises:
starting, by a triggering device, a camera module of the triggering device, and sending, by the triggering device, a first image-capturing instruction to at least one device of the N devices, wherein the first image-capturing instruction is configured to enable the at least one device to start a camera module of the at least one device, and the triggering device is any one of the N devices; or wherein before sending, by the source device, the target content to the target device, the method further comprises:

sending, by the source device, a second image-capturing instruction to N-1 devices other than itself, wherein the second image-capturing instruction is configured to enable the camera modules of the N-1 devices to remain in a starting state.

6. The method according to claim 5, wherein the identifying device is the source device, and before outputting, by the source device, the target content, the method further comprises:

in a case where a first data packet comprises first image data, determining, by the source device, itself to be the sending device of the target content by implementing:

collecting, by the source device, the first image data through a camera module, and receiving, by the source device, the first image data from N-1 devices other than the source device;

performing, by the source device, a first identifying processing for the first image data, and determining first gesture confidences of the first image data;

selecting, by the source device, a first gesture confidence with a highest confidence in the first gesture confidences; and determining, by the source device, itself to be a device corresponding to the first gesture with the highest confidence.

7. The method according to claim 5, wherein the identifying device is the source device, and before outputting, by the source device, the target content, the method further comprises:

in a case where a first data packet comprises a first gesture confidence, determining, by the source device, itself to be the sending device of the target content by implementing:

performing, by the source device, a first identifying processing for first image data collected by the source device, obtaining, by the source device, first gesture confidences, and receiving, by the source device, the first gesture confidences from N-1 devices other than the source device;

performing, by the source device, a sorting processing for the first gesture confidences; and determining, by the source device, itself to be a device corresponding to the first gesture with a highest confidence.

8. The method according to claim 5, wherein the identifying device is the source device, and before sending, by the source device, the target content to the target device, the method further comprises:

in a case where a second data packet comprises second image data, determining, by the source device, the target device to be the receiving device of the target content by implementing:

receiving, by the source device, the second image data from the N-1 devices other than the source device;

performing, by the source device, a second identifying processing for the second image data, and determining second gesture confidences of the second image data;

selecting, by the source device, a second gesture confidence with a highest confidence in the second gesture confidences; and determining, by the source device, a device, which corresponds to the second gesture with the highest confidence, to be the target device.

9. The method according to claim 5, wherein the identifying device is the source device, and before sending, by the source device, the target content to the target device, the method further comprises:

in a case where a second data packet comprises a second gesture confidence, determining, by the source device, the target device to be the receiving device of the target content by implementing:

receiving, by the source device, second gesture confidences from the N-1 devices other than the source device;

performing, by the source device, a sorting processing for the second gesture confidences; and determining, by the source device, a device, which corresponds to the second gesture with a highest confidence, to be the target device.

10. The method according to claim 5, wherein the identifying device is the target device, and before outputting, by the source device, the target content, the method further comprises:

in a case where a first data packet comprises first image data, determining, by the target device, the source device to be the sending device of the target content by implementing:

collecting, by the target device, the first image data through a camera module, and receiving, by the target device, the first image data from N-1 devices other than the target device;

performing, by the target device, a first identifying processing for the first image data, and determining first gesture confidences of the first image data;

selecting, by the target device, a first gesture confidence with a highest confidence in the first gesture confidences; and determining, by the target device, a device, which corresponds to the first gesture with the highest confidence, to be the source device.

11. The method according to claim 5, wherein the identifying device is the target device, and before outputting, by the target device, the target content, the method further comprises:

in a case where a first data packet comprises a first gesture confidence, determining, by the target device, the source device to be the sending device of the target content by implementing:

performing, by the target device, a first identifying processing for first image data collected by the target device, obtaining first gesture confidences, and receiving, by the target device, the first gesture confidences from N-1 devices other than the target device;

performing, by the target device, a sorting processing for the first gesture confidences; and determining, by the target device, a device, which corresponds to the first gesture with a highest confidence, to be the source device.

12. The method according to claim 5, wherein the identifying device is the target device, and before sending, by the source device, the target content to the target device, the method further comprises:

in a case where a second data packet comprises second image data, determining, by the target device, itself to be the receiving device of the target content by implementing:

collecting, by the target device, the second image data through a camera module, and receiving, by the target device, the second image data from N-2 devices other than the source device and itself;

performing, by the target device, a second identifying processing for the second image data, and determining second gesture confidences of the second image data;

selecting, by the target device, a second gesture confidence with a highest confidence in the second gesture confidences; and determining, by the target device, itself to be a device corresponding to the second gesture with the highest confidence.

13. The method according to claim 5, wherein the identifying device is the target device, and before sending, by the target device, the target content to the target device, the method further comprises:

in a case where a second data packet comprises a second gesture confidence, determining, by the target device, itself to be the receiving device of the target content by implementing:

performing, by the target device, a second identifying processing for second image data collected by the target device, obtaining second gesture confidences, and receiving, by the target device, the second gesture confidences from N-2 devices other than the source device and itself;

performing, by the target device, a sorting processing for the second gesture confidences; and determining, by the target device, itself to be a device corresponding to the second gesture with a highest confidence.

14. The method according to claim 5, wherein the identifying device is a first device, the first device is any one of the N devices other than the source device and the target device, and before outputting, by the source device, the target content, the method further comprises:

in a case where a first data packet comprises first image data, determining, by the first device, the source device to be the sending device of the target content by implementing:

collecting, by the first device, the first image data through a camera module, and receiving, by the first device, the first image data from N-1 devices other than the first device;

performing, by the first device, a first identifying processing for the first image data, and determining first gesture confidences of the first image data;

selecting, by the first device, a first gesture confidence with a highest confidence in the first gesture confidences; and determining, by the first device, a device, which corresponds to the first gesture with the highest confidence, to be the source device.

15. The method according to claim 5, wherein the identifying device is a first device, the first device is any one of the N devices other than the source device and the target device, and before outputting, by the source device, the target content, the method further comprises:

in a case where a first data packet comprises a first gesture confidence, determining, by the first device, the source device to be the sending device of the target content by implementing:

performing, by the first device, a first identifying processing for first image data collected by the first device, obtaining first gesture confidences, and receiving, by the first device, the first gesture confidences from N-1 devices other than the first device;

performing, by the first device, a sorting processing for the first gesture confidences; and determining, by the first device, a device, which corresponds to the first gesture with a highest confidence, to be the source device.

16. The method according to claim 5, wherein the identifying device is a first device, the first device is any one of the N devices other than the source device and the target device, and before sending, by the source device, the target content to the target device, the method further comprises:

in a case where a second data packet comprises second image data, determining, by the first device, the target device to be the receiving device of the target content by implementing:

collecting, by the first device, the second image data through a camera module, and receiving, by the first device, the second image data from N-2 devices other than the source device and itself;

performing, by the first device, a second identifying processing for the second image data, and determining second gesture confidences of the second image data;

selecting, by the first device, a second gesture confidence with a highest confidence in the second gesture confidences; and determining, by the first device, a device, which corresponds to the second gesture with the highest confidence, to be the target device.

17. The method according to claim 5, wherein the identifying device is a first device, the first device is any one of the N devices other than the source device and the target device, and before sending, by the source device, the target content to the target device, the method further comprises:

in a case where a second data packet comprises a second gesture confidence, determining, by the first device, the target device to be the receiving device of the target content by implementing:

performing, by the first device, a second identifying processing for second image data collected by the first device, obtaining second gesture confidences, and receiving, by the first device, the second gesture confidences from N-2 devices other than the source device and itself;

performing, by the first device, a sorting processing for the second gesture confidences; and determining, by the first device, a device, which corresponds to the second gesture with a highest confidence, to be the target device.

18. The method according to claim 5, wherein the starting, by the triggering device, the camera module of the triggering device according to the triggering instruction, and sending the first image-capturing instruction to at least one device of the N devices, comprises:

starting, by the triggering device, the camera module of the triggering device, in a case where a triggering instruction, which meets a preset triggering condition, is received by the triggering device;

obtaining, by the triggering device, a current working state of N-1 devices other than itself, wherein the working state comprises a running state and a non-running state;

selecting, by the triggering device, a device in the running state from the N-1 devices; and sending, by the triggering device, the first image-capturing instruction to the device in the running state.

19. An electronic device, comprising an application processor, a memory, and one or more programs, wherein the one or more programs are stored in the memory and are configured to be executed by the application processor, and the one or more programs comprise an instruction for performing:

controlling camera modules of N devices to collect first image data, wherein N is a natural number greater than or equal to 2;

determining a source device in the N devices based on the first image data;

controlling camera modules of N-1 devices other than the source device to collect second image data;

determining a target device in the N-1 devices based on the second image data; and controlling the source device for transferring a target content to the target device;

wherein before controlling the source device for transferring a target content to the target device, the method further comprises:

generating, by the source device, prompting information, wherein the prompting information is configured to prompt a user that the target content is ready to be transferred; or wherein before controlling camera modules of N devices to collect first image data, the method further comprises:

starting, by a triggering device, a camera module of the triggering device, and sending, by the triggering device, a first image-capturing instruction to at least one device of the N devices, wherein the first image-capturing instruction is configured to enable the at least one device to start a camera module of the at least one device, and the triggering device is any one of the N devices; or wherein before controlling camera modules of N-1 devices other than the source device to collect second image data, the method further comprises:

sending, by the source device, a second image-capturing instruction to N-1 devices other than itself, wherein the second image-capturing instruction is configured to enable the camera modules of the N-1 devices to remain in a starting state; or the one or more programs comprise an instruction for performing:

outputting, by a source device, a target content, wherein the source device is a sending device of the target content, which is determined by an identifying device according to first data generated by N devices, N is a natural number greater than or equal to 2, the N devices comprise the identifying device, the source device, and a target device, any two devices of the N devices communicate with each other, and the identifying device is any one of the N devices; and sending, by the source device, the target content to the target device, wherein the target device is a receiving device of the target content, which is determined by the identifying device according to second data generated by the N device;

wherein before sending, by the source device, the target content to the target device, the method further comprises:

generating, by the source device, prompting information, wherein the prompting information is configured to prompt a user that the target content is ready to be transferred; or wherein before outputting, by the source device, the target content, the method further comprises:

starting, by a triggering device, a camera module of the triggering device, and sending, by the triggering device, a first image-capturing instruction to at least one device of the N devices, wherein the first image-capturing instruction is configured to enable the at least one device to start a camera module of the at least one device, and the triggering device is any one of the N devices; or wherein before sending, by the source device, the target content to the target device, the method further comprises:

sending, by the source device, a second image-capturing instruction to N-1 devices other than itself, wherein the second image-capturing instruction is configured to enable the camera modules of the N-1 devices to remain in a starting state.

* * * * *